April 14, 1959 R. GOUIRAND 2,882,067
PNEUMATIC VEHICLE SUSPENSION
Filed Nov. 6, 1953 5 Sheets-Sheet 1

INVENTOR.
RENE GOUIRAND
BY
*Cornelius Zaluske*
ATTORNEY

United States Patent Office 2,882,067
Patented Apr. 14, 1959

2,882,067

PNEUMATIC VEHICLE SUSPENSION

Rene Gouirand, New York, N.Y.

Application November 6, 1953, Serial No. 390,540

21 Claims. (Cl. 280—104.5)

This invention relates to suspensions for motor vehicles and is directed more particularly to that type of suspension wherein the weight of the vehicle is supported upon pneumatic cushions in lieu of the steel springs which have so long been used for suspension purposes.

The primary object of this invention is to provide a pneumatic suspension capable of supporting the body of the vehicle with equal facility and easy riding, both when the vehicle is empty and when carrying heavy loads.

Another object of the invention is to provide a pneumatic suspension which will withstand hard usage over rough roads and will require little or no maintenance over protracted periods.

A further object of this invention is the provision of a pneumatic suspension which will be extremely flexible and thus self-adjusting to uneven road surfaces, whereby the tires are subjected to uniform wear and the body and chassis frame are relieved of twisting and bending stresses to which they would be subjected in the absence of adequate flexibility of the mounting between the axle and the frame.

Another object of the invention is to provide a pneumatic suspension which does not require rigid torque rods or heavy longitudinal or transverse bracing and wherein draft and braking, as well as transverse forces, are adequately carried by the suspension itself.

The invention embodies numerous novel features, among which may be mentioned the utilization of novel means adapted to compensate for surges of varying pressures resulting from uneven road surfaces, for the purpose of producing smooth riding qualities. This means may partake of various forms, as hereinafter more fully described, but involves, generally speaking, the utilization of two or more diaphragms adapted to be subjected by the load to differential pressures which compensate for shocks transmitted from the road and level or smooth out these shocks with the minimum of their transmission to the body of the vehicle.

Another feature of the invention comprises a pneumatic suspension which may be used either singly or in tandem on trucks, tractors, or trailers, according to the requirements of the particular vehicle so equipped.

Another feature of the invention comprises a pneumatic suspension which may be embodied in either a direct suspension between the chassis frame and the axle or incorporated in a cantilever or leverage construction interposed between them.

Another feature of the invention resides in the utilization of a plurality of cantilever pneumatic suspensions arranged in tandem with the rear suspension connected to either the forward suspension of the tandem or directly to the chassis frame.

Still another feature of the invention consists in a novel arrangement of snubber cables whereby the cables at both sides of the vehicle may be simultaneously adjusted to the same tension.

Another feature of the invention embodies pneumatic suspensions well adapted for use in connection with the front wheels of a vehicle and in one form of which suspension the reactionary forces, resulting from unevenness in the road, are transmitted to the chassis frame and superimposed body in a direction longitudinally of the vehicle instead of vertically.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

Referring first to the form of the invention shown in Figs. 1–6, 1 designates the side beams of the chassis frame of the vehicle on which the body 2 is supported. In these views a tandem pneumatic suspension is shown and consequently two axles 3 and 4 are positioned in parallel relation beneath the frame. Each of these axles is shown as equipped with dual wheels 5. The structure of Figs. 1–6 is of the directly connected type wherein a pneumatic suspension is positioned directly above each axle and below the body, in contradistinction to the cantilever construction shown in Figs. 7 and 8 where each pneumatic suspension is forwardly of an axle.

Each pneumatic suspension shown in Figs. 1–6 comprises a carrier member or carrier 6 mounted rigidly on the axle intermediate the ends of the latter. This carrier is shown as embodying an upright bowl-like portion 7, which may be hereinafter referred to as the bowl, and this bowl is provided with a forwardly extending tongue 8.

Figure 5:
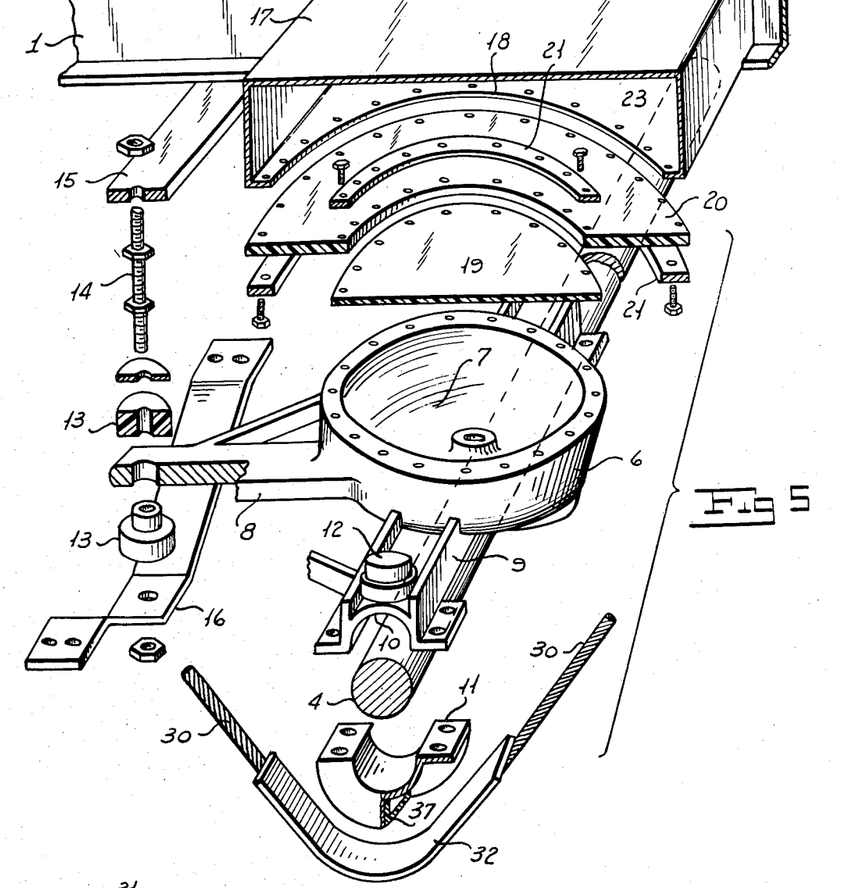
Fig. 5 is an exploded perspective view showing the separated parts of the structure of Figs. 1–4 inclusive.
Figure 6:
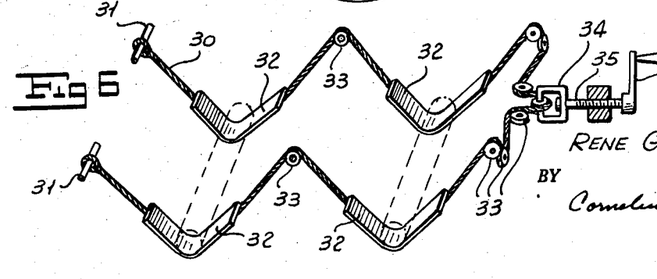
Fig. 6 is a perspective view of the preferred form of snubber cable and means for adjusting the same, these parts being shown as separated from the other parts of the vehicle.

By reference to Fig. 5, it will be noted that the bowl is provided with laterally extending arms 9 which carry yokes 10 at their outer ends. These yokes seat on the axle and are secured thereto by caps 11 underlying the axle and bolted to the flanges of the yokes, so as to rigidly mount the carrier on the axle. The arms 9 carry bumpers 12 so placed as to engage the under side of the side beams 1 in the event of undue shock or failure of the pneumatic cushion, although ordinarily they are spaced some little distance from the chassis beams.

The tongue 8 is supported from the side beams of the chassis frame in a manner to permit of limited pivotal or universal movement in all directions. This may be conveniently accomplished by the provision of rubber blocks 13 perforated for the passage of a bolt 14, the upper end of which is secured to a transverse bar 15 carried by the side beams 1, while the other end of the bolt is rigidly secured to a transverse hanger 16. The opposite ends of the hanger may be fastened to the side beams 1 by the same bolts or rivets which support the transverse bar 15. This arrangement, which may be varied without departing from the spirit of this invention, permits up and down movement of the bowl 7 and lateral tilting of the same, so as to provide a flexible connection between the axle and the chassis frame. This flexible connection is desirable in order that the wheels may follow uneven road surfaces without transmitting undesirable torque to said frame.

Positioned above the bowl and rigidly secured between the side beams 1 of the frame is a walled housing 17. In this form of the invention, the walls of the housing are rigid, but the bottom wall is provided with an opening 18. This opening, as well as the bowl, are shown as circular, although, in practice, they may be of any desired shape. However, with the circular arrangement, there is interposed between the housing and carrier, a two part diaphragm which operates, in effect, as two diaphragms. That is to say, over the open top of the bowl is secured an elastic diaphragm 19, while the opening 18 is considerably larger than the outer diameter of the bowl and there is interposed, between the bowl and the margin of the opening 18 of the housing 17, an annular diaphragm 20. Both the diaphragms 19 and 20 are peripherally perforated and registering perforations are also provided in the margins of the bowl and about the opening 18 for the passage of bolts or machine screws which serve to secure the diaphragms in position. By this means the outer periphery of the circular diaphragm 19 and the inner periphery of the annular diaphragm 20 are marginally secured in overlapping relation to the upper face of the bowl 7, while the outer margin of the annular diaphragm 20 is secured to the margin of the opening 18. Metal rings 21 are provided to act as washers for the bolts or screws thus employed as fastening devices.

The concentric diaphragms 19 and 20 are both yieldable and elastic. In practice, they may be of the same material and of the same weight, although in this form of construction, I preferably make the annular diaphragm relatively heavy and incorporate within it appropriate fabric or cord, so as to impart to it considerable tensile strength appropriate to the loads to be carried. The circular diaphragm 19 is, however, preferably made thinner and more elastic. Rubber, either natural or synthetic, is well adapted for these purposes.

When the parts are assembled, as stated, two distinct and separate chambers, adapted to contain air under pressure, result. One chamber is indicated at 22 in Fig. 3 and constitutes what may be aptly termed a surge chamber. The other chamber, designated 23, is a primary air chamber. The upper face of the annular diaphragm is exposed to the interior of the primary air chamber, while its exterior is exposed to the atmosphere. The upper surface of the diaphragm 19 is exposed to pressure in the primary air chamber, while its opposite surface is exposed to air in the bowl 7, which bowl may be entirely sealed thereby so that the surge chamber 22 constitutes a sealed chamber. However, in practice it is preferred to provide in the base of the bowl a single vent opening 24, shown best in Fig. 3. This vent opening is shown with a raised peripheral boss, the upper edge of which forms a valve seat adapted to cooperate with a valve 25 of soft yieldable material, such as sponge rubber or foam rubber carried by the diaphragm 19. Under normal conditions, the valve 25 remains free from its seat. It only engages with said seat when the vehicle is carrying heavy loads or is subjected to abnormally heavy shocks from the road.

Figure 1:
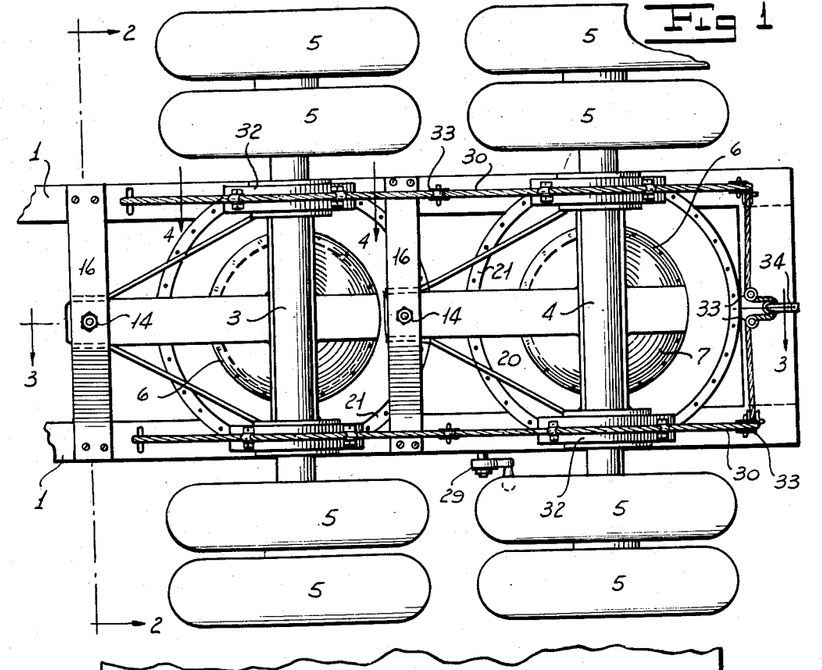
Fig. 1 is an underneath plan view of a tandem pneumatic suspension embodying the present invention.
Figure 2:
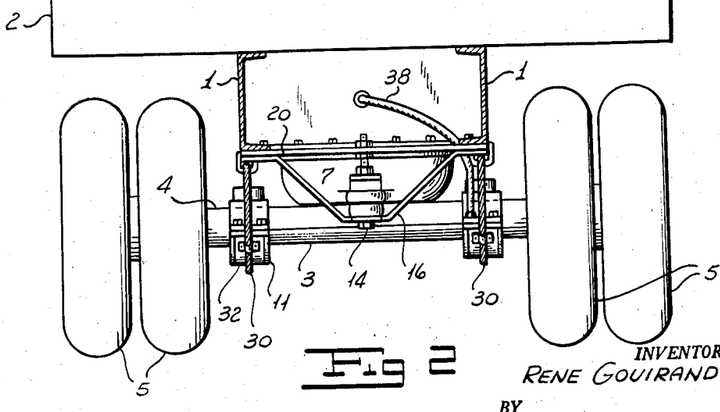
Fig. 2 is a vertical section looking toward the rear of the vehicle and taken in the plane of the line 2—2 of Fig. 1.
Figure 3:
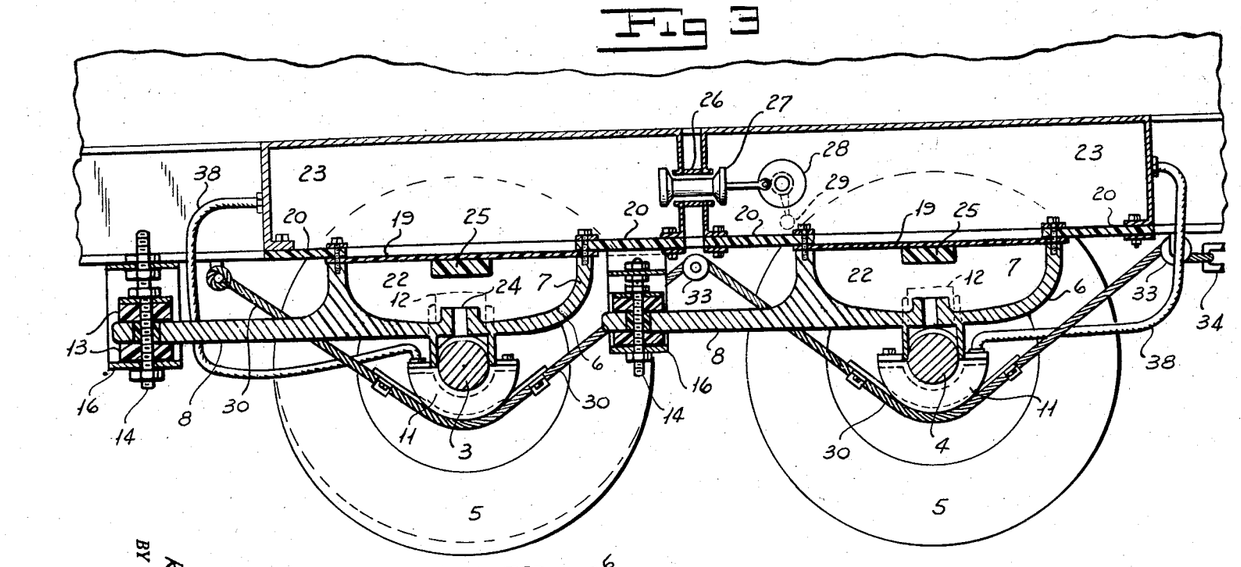
Fig. 3 is a vertical section on the line 3—3 of Fig. 1.

If the suspension thus far described is to be used as a single suspension, i.e., a suspension embodying a single axle, it may be employed alone as already described. However, when used in a tandem wheel suspension, such as shown in Figs. 1, 2 and 3, the assemblies described are duplicated, one in advance of the other. In order to obtain maximum cushioning effect with such an arrangement, the resulting two primary air chambers 23 may be connected together by a passage 26 with which cooperates a double acting valve 27. The stem of this valve is connected to an arm, cam or eccentric 28 adapted to be operated by a handle 29. This handle is shown in Fig. 3 in a position wherein both faces of the double acting valve are unseated, so as to provide open communication between the two primary air chambers 23. In the event of a flat tire or for other numerous reasons, it is desired to utilize only one axle as a weight carrier, the handle 29 may be turned through 90 degrees clockwise or anti-clockwise from the position shown in Fig. 3 to seat one or the other end of the double acting valve 27 and thus isolate one primary air chamber from the other. While it is not considered necessary here to explain different uses of this double acting valve arrangement, the following may be pointed out as illustrative.

In the event that the vehicle is traveling light or empty, the air pressure in one of the chambers 23 may be appreciably lessened while the pressure in the other chamber 23 is increased after sealing off this latter chamber from the other. This operation will impose the weight of the vehicle on the axle of the chamber 23 carrying the greatest pressure and take practically all of the weight off of the other axle, so that the truck may travel only on the wheels over which the chamber having the greatest pressure is located. Also by removing the weight from one axle, the tires of that axle may be changed without requiring jacking of the vehicle, this being particularly so if the air is let out of the tires to be removed.

To fulfill the snubbing function desirable in suspensions of this kind, the structure of this invention may conveniently utilize one or more cables 30, slung between the side walls of the chassis and passing beneath the caps 11. These cables may be independently slung under each axle, but in Figs. 3 and 4 and 6 a highly satisfactory arrangement is shown, whereby a single cable 30 may be employed. The opposite ends of this cable are anchored to hangers 31 on the side beams 1, while the intermediate portions of the cables pass beneath stirrups 32 and over rollers 33 to a swivel 34 mounted on a common tensioning screw 35 having a crank handle 36. Through manipulation of the crank, the tensioning screw will uniformly adjust the snubber cable to both sides of both axles.

Figure 4:
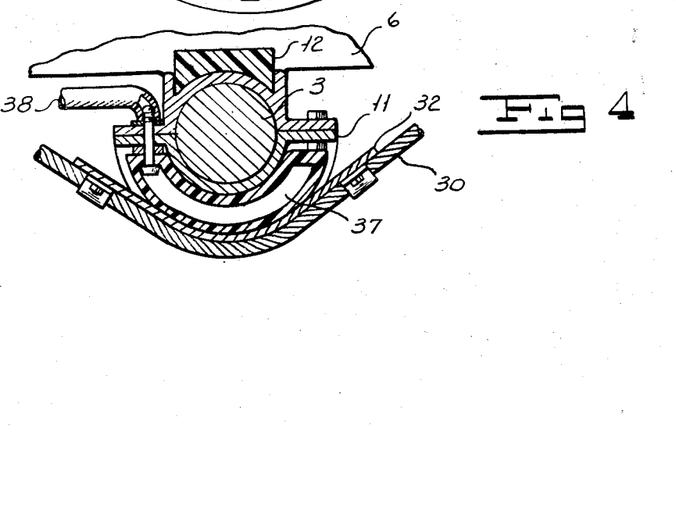
Fig. 4 is a like fragmental section taken in the plane of the line 4—4 of Fig. 1.

The stirrups 32 may, if desired, be in direct contact with the caps 11, but I prefer, when dealing with vehicles adapted to carry heavy loads, to have these stirrups seat against the under sides of interposed pneumatic cushions 37, as shown best in Fig. 4. These cushions may be of resilient rubber, but are preferably made hollow to contain pneumatic pressure which may be communicated to the several cushions by tubular connections 38 leading from the primary air chambers, as shown in Fig. 3.

The hereinbefore described arrangement operates in the following manner: Compressed air from a compressed air tank, pump or other source of supply, is admitted into the primary air chambers 23 in such quantity and at such pressures as are appropriate to the load to be carried and such air may be added as loading takes place or prior to loading as may be most convenient and may be relieved during unloading or after the same as desired.

The pressure in the primary chambers 23 acts as the primary support for the load, while the air in the surge chamber 22 will function in different ways depending on whether this chamber is fully sealed or not. If it is completely sealed, the diaphragm 19 will be bulged downwardly under the pressure in the chamber 23 until the pressure in the surge chamber 22 will balance and the load will thus be supported.

If the wheels strike a bump in the road, the annular diaphragm 20 will be flexed upwardly to increase the pressure in the chamber 23 sufficiently to sustain the load, but during the impulse of this increase in pressure, such pressure will act upon the diaphragm 19 to further flex it in a downward direction against the pressure trapped in the surge chamber 22, so that by these differential pressures, the surge of pressure in the chamber 23 is taken up by the diaphragm 19 and the chassis frame does not react appreciably to such surge. If, in addition to the operation of the diaphragm 19 upon the surge chamber of the particular wheel which has encountered the bump, the valve 27 is open, some of the pressure generated by the bump will pass through into the other primary air chamber 23 which will serve as an additional surge chamber, while the pressure in such additional surge chamber will act against the diaphragm 19 thereof to further cushion the bump in the corresponding surge chamber 22. If the structure be such that only a single suspension is used, or if the valve 27 is closed, the operation of the second primary air chamber 23, as described, will be absent, but it is evident that a single surge chamber 22, functioning with a single primary air chamber 23, will very materially smooth out the shocks from uneven roads.

In the operation just described, it has been assumed that the surge chamber 22 is sealed entirely or at least except for one or more very small openings which will permit of the entrance of atmospheric air, so that air may be at all times contained in the surge chamber, while the escape of pressure therein is so retarded so as not to interfere with the functioning of the surge chamber under quickly applied air pressure impulses.

In the showing of Fig. 3, wherein the surge chamber 22 is provided with a single vent 24, the latter arrangement is shown with some modification. The opening 24 should be made of such size that air under pressure may escape from that opening during the initial impulse, but said escape should be relatively limited, so that the surge chamber may function to produce the differential pressures to which I have referred. An opening, provided with a valve 25 on the diaphragm 19, is better for the transporting of heavy loads for in that case the pressure normally within the primary chamber is greater than with lighter loads and consequently there will be a greater downward bulging of the diaphragm 19. With extremely heavy loads, this diaphragm may be bulged down far enough to engage the valve 25 with its seat and thus seal the opening 24 so that the surge chamber will function as a closed chamber for such loads, the diaphragm still being able to further expand and increase the pressure in the surge chamber 22 if bumps on the road are encountered. However, when the load is removed and the vehicle is traveling light, the pressure in the primary air chamber 23 will be lessened, or should be lessened by control of the driver, so as to permit the diaphragm 19 to retract sufficiently from the opening to relieve pressure in the surge chamber and thus produce much smoother and easier riding conditions than would otherwise be the case. By connecting the cushions 37 above the snubbing cable with the primary air chamber, the pressures in these two chambers are substantially balanced for both light and heavy loads and consequently the tendency to rebound after striking the bump will be neutralized and compensated for.

Compressed air may be supplied to the primary air chambers in any suitable manner. However, it is convenient to feed such air from a compressed air supply tank on the vehicle to said chambers through piping connections which include one or more valves readily accessible to the driver.

Figure 7:
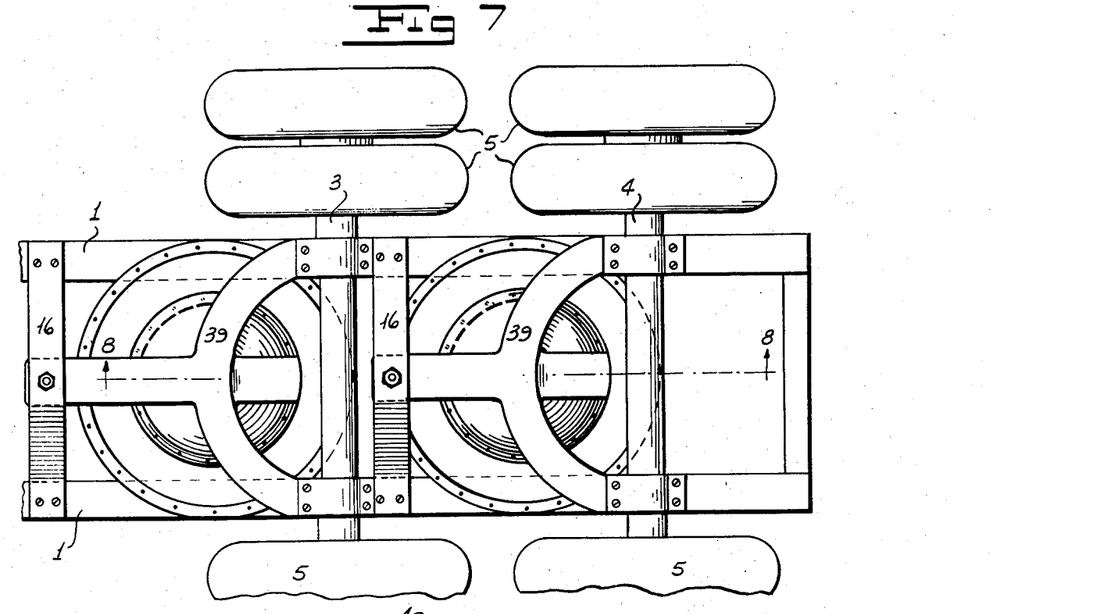
Fig. 7 is an underneath plan view showing a modified form of the invention.
Figure 8:
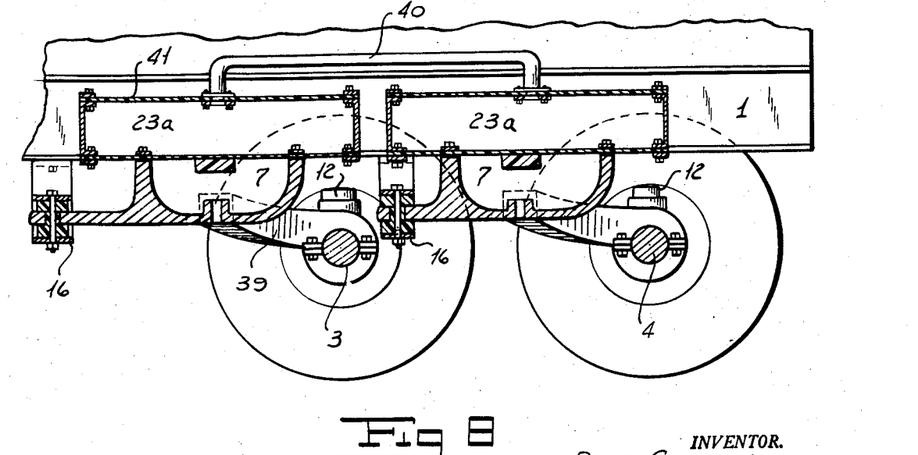
Fig. 8 is a vertical section on the line 8—8 of Fig. 7.

In Figs. 7 and 8 of the drawings, a cantilever suspension is shown wherein the bowls 7 are supported on levers in the form of frames 39, the bowls being intermediate the ends of the levers. The rear end of each lever is secured to one of the axles as shown, while the forward end of each lever is anchored to a hanger 16, as in the construction of the preceding figures.

In Figs. 7 and 8, the snubbers have been omitted in the interest of clearness, although they are ordinarily provided. The bowl 7 may be constructed, as in the preceding figures, and the same general arrangement of annular and circular diaphragms may be employed with a communicating passage corresponding to the passage 26. However, the structure may be varied, as indicated in Figs. 7 and 8, in the following particulars.

The annular and the circular diaphragms may be made integral with one another and, instead of utilizing the communicating passage 26, the two chambers may be connected by a conduit 40, either with or without a controlling valve corresponding to the valve 27. The top wall of the primary air chamber 23a, which corresponds to the chamber 23, may be made rigid or, if desired, this wall may be a resilient diaphragm 41 in which case the connecting conduit 40 should also be flexible, so as to permit a flexing of the diaphragms 41. When the diaphragms 41 are employed, they are preferably made sufficiently heavy to withstand heavy loads which may be carried by the vehicle, but should be sufficiently resilient and yieldable to cooperate with the surge chamber or chambers of the structure in cushioning road shocks.

In Figs. 9–12, a pneumatic suspension is shown which is peculiarly adapted for use in connection with the front wheels of vehicles. In this showing, the primary air chamber 23b is within a housing 17b rigidly secured by an appropriate bracket 42 to one of the side beams of the chassis frame, the arrangement being duplicated for each side beam. The bottom of the housing is closed by an annular diaphragm 43, the outer margin of which is secured to the open bottom of the housing, while the inner margin is secured to a carrier 44. This carrier is attached to the corresponding wheel spindle 45 by a cap 46 faced on its under side with a snubber cushion 47 which may be either solid or a pneumatic cushion with a tubular connection between its interior and the chamber 23b, as in the preceding figures. A snubber cable 48 passes beneath the snubber cushion 47 with its ends anchored, adjustably or otherwise, to the overlying side beam.

Figures 9, 10, 11, 12, 13, 14:
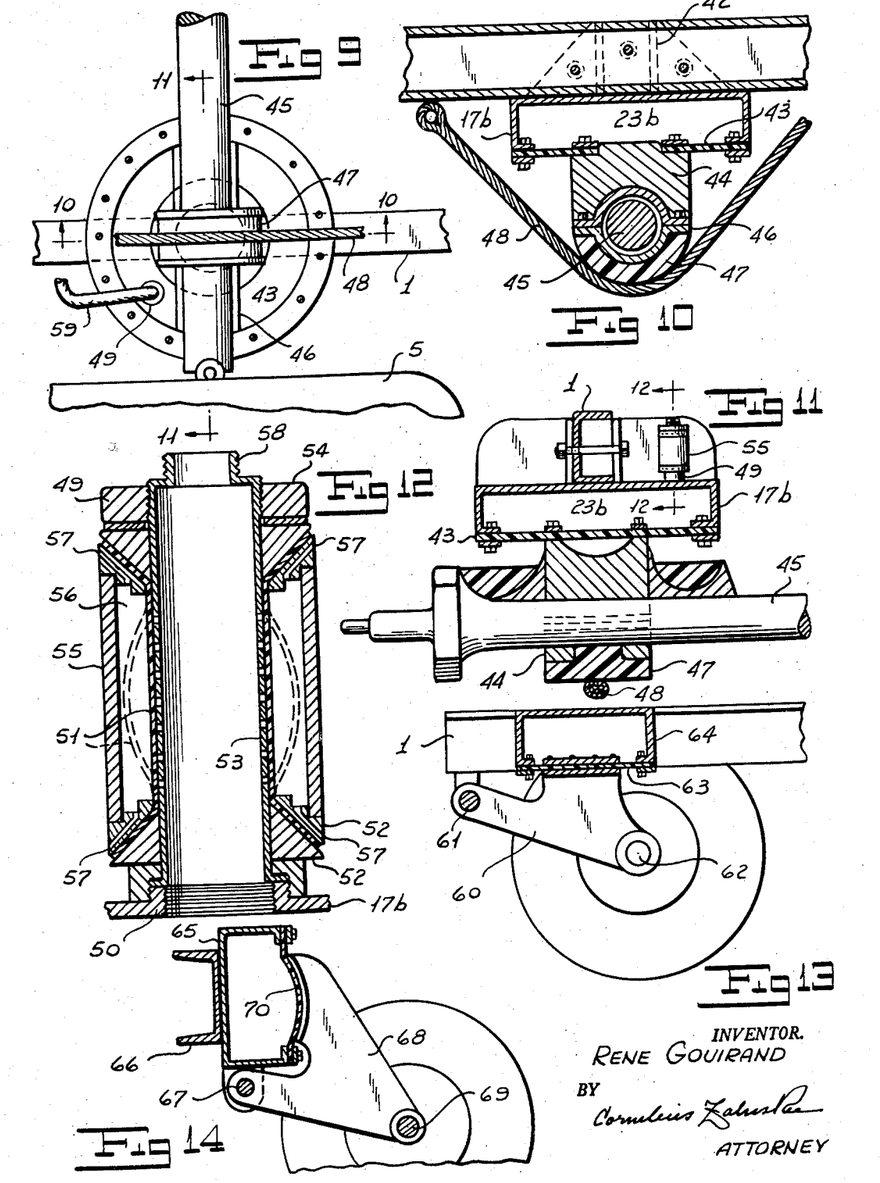
Fig. 9 is an underneath plan view of a pneumatic front free suspension embodying the present invention.
Fig. 10 is a section on the line 10—10 of Fig. 9.
Fig. 11 is a section on the line 11—11 of Fig. 9.
Fig. 12 is a section on the line 12—12 of Fig. 11.
Fig. 13 shows a modified form of front wheel pneumatic suspension.
Fig. 14 shows a further modified form of front wheel pneumatic suspension.

The surge chamber of this construction is embodied in a fitting 49, shown best in Fig. 12. This fitting is attached to a threaded boss 50 on the top wall of the housing 17b and it embodies essentially an elastic resilient tube 51 within a surge chamber casing. The upper and lower ends of this tube are clamped between opposed conical members 52 and through the tube extends a hollow perforated post 53, externally threaded at its upper end to receive a nut 54 which holds the parts in assembled relation. The resilient elastic tube is surrounded by a surge chamber casing 55 spaced from the tube sufficiently to permit the tube to be expanded intermediate its ends, as indicated in dotted lines, so that said tube may function after the manner of the diaphragm 19 of Figs. 1–5. The space between the exterior of the tube and the casing 55 is designated 56 and constitutes the surge chamber from which lead vents 57 corresponding to the opening 24.

The upper end of the post 53 is preferably provided with a threaded boss 58 to which may be attached one end of a hose connection 59, the other end of which is attached to a corresponding boss associated with the fitting on the wheel spindle at the opposite side of the vehicle. This construction therefore not only has the advantages of the surge chamber 56, but also the advantage of the surge chamber and primary air chamber at the other side of the vehicle, all of which parts collectively function to cushion the shocks of uneven road surfaces.

In Fig. 13 another front wheel pneumatic cushion construction is illustrated, this being of the cantilever type. Here a cantilever lever 60 is pivoted at one end of a fixed pivot 61 on the frame, while at its other end it carries a wheel spindle 62. Intermediate its ends, it is secured to a diaphragm 63 which closes the lower end of a housing 64 supported on one of the side beams 1 of the chassis frame. No surge chamber is shown in Fig. 13 and it may be used without one as may also be the case in the structure of Figs. 9–12. However, the type of surge chamber shown in Fig. 12 may be associated with the housing 64 of the structure of this Fig. 13. In this case the wall 17b in Fig. 2 would constitute the top wall of the housing 64.

In Fig. 14 a further modified form of construction is shown for front wheel suspension. In this showing, a housing 65, the interior of which constitutes a primary air chamber, is secured to a transverse element 66 of the chassis frame. On a pivot 67, rigid with the housing, is pivotally supported a bell crank lever 68, the elbow of which carries the spindle 69 of one front wheel. The other end of the lever is secured to a diaphragm 70 which closes one face of the housing 65 to form an enclosed primary air chamber. The housing 65 may be equipped with the fitting shown in Fig. 12 to provide a surge chamber either with the connection to the companion surge chamber at the opposite side of the vehicle, or the two primary air chambers may be merely connected together by a conduit, such as the conduit 40 in Fig. 8.

A pronouncedly novel result accrues from the use of the structure of the suspension shown in Fig. 14. Here it appears that the diaphragm is positioned in a substantially vertical plane and the pivotal connection between the bell crank lever and the chassis frame is positioned in longitudinally spaced relation to the wheel spindle. Thus the pivotal movement of the bell crank, during the passage of the wheel over rough roads, causes the bell crank to act against the diaphragm in a direction longitudinally of the vehicle rather than in a vertical direction as is most commonly the case. It therefore follows that the reactive forces resulting from the encountering of a bump will tend to impel the vehicle forwardly rather than upwardly and consequently the shock of striking such bump will not be apparent to an occupant of the vehicle.

It will be noted from Figs. 13 and 14 that the lever is secured to the diaphragm off center of the latter, i.e., toward the near edge of the diaphragm with respect to the pivotal connection to the chassis frame. The reason for this is that the movements transmitted to the lever from the uneven surface of the road are greater at the axle end of the lever than at the chassis or fixed pivot end of such lever and thus the points of attachment of the lever to the diaphragm will result in the flexing of the diaphragm in a degree directly proportional to the distance from the fixed pivot of the lever. By making the attachment between the lever and the diaphragm off center and closer to the fixed pivot, a greater effective area of flexing of the diaphragm is provided where the greater flexing takes place and consequently a more efficient operation of the diaphragm results. This applies not only to the structures of Figs. 13 and 14, but also to the structures of the other figures and particularly those where the cantilever suspension is involved. Thus, while I have shown the attachment of the lever to the diaphragm as centrally located in Fig. 8, such attachment may be, and preferably is, in practice, off center for the reasons stated, i.e., such zone of attachment in each case is preferably nearer the fixed pivot than to the axle or spindle, as the case may be, so the effective width of the flexible portion of the diaphragm remote from the fixed pivot is wider than that portion contiguous to such pivot. It will be noted that in Fig. 3 this off-center attachment is shown for the left hand primary air chamber 23.

In each of the foregoing forms of the invention, the connection between the axle and the chassis frame is sufficiently flexible to permit all of the wheels associated with each suspension to follow uneven road surfaces without requiring twisting of the chassis frame and body, to accommodate differences in elevation due to such uneven road conditions. By following such road surface, all of the tires of each suspension are subjected to uniform wear while permitting the body to ride smoothly and evenly.

The suspensions of this invention are especially useful on trucks, tractors and trailers. When associated with the rear wheels of such vehicles, the diaphragms, which isolate the open bottoms of the primary air chambers from the atmosphere, are arranged in substantially horizontal planes, i.e., in planes normal to draft, braking and lateral forces. These forces are therefore transmitted through such diaphragms in a direction substantially parallel to the planes in which they are located and inasmuch as these diaphragms are sturdy, they are, of themselves, well adapted to sustain these forces. Consequently these suspensions do not require the employment of such extraneous devices as heavy torque rods or rigid bracing, so commonly necessary in prior pneumatic suspensions.

All structures involved in this invention are relatively simple, easily fabricated by known methods and relatively light for the work which they accomplish. The heaviest loads may be supported by these constructions through the utilization of surprisingly low air pressures, thus materially lightening the pumping apparatus for supplying such pressures to the storage tank and at the same time minimizing serious strains upon all diaphragms involved and also making it possible to use relatively light and thin housings about the primary air chambers. By thus lightening the structural parts of the suspension and its adjuncts the vehicle is enabled to carry a correspondingly greater pay load.

Experience with my suspensions has demonstrated that they require practically no maintenance over long periods, even when subjected to hard usage and the imposition thereon of heavy loads. They have given particularly outstanding performance when used on heavy trailers, as well as on trucks. The driver need give little, if any thought to their presence, other than when the loading is widely varied, he finds it advantageous to adjust the air pressures in the primary air chambers to such widely differing conditions. The advantage of so doing is that the vehicle may be smooth riding at all times, for the carrying of greatly excessive pressures in these chambers, when the vehicle is traveling light, will manifestly cause the body of the vehicle to be harder riding than if such pressures were lessened.

The foregoing detailed description sets forth the invention in its preferred practical forms, but the invention is to be understood as fully commensurate with the appended claims.

Having thus fully described the invention, what I claim as new and desire to secure by Letters Patent is:

1. A pneumatic suspension comprising: a chassis frame, two primary air chambers positioned in tandem on the chassis frame, each of which has an open bottom closed by a diaphragm, an axle beneath each diaphragm, and an interposed carrier secured to each axle and also secured to the overlying diaphragm, each carrier being provided with a surge chamber underlying a portion of the corresponding diaphragm and thereby isolated from the overlying primary air chamber.

2. A pneumatic suspension according to claim 1, wherein the portion of the diaphragm which isolates each surge chamber is of greater elasticity than the remaining portion of the corresponding diaphragm.

3. A pneumatic suspension according to claim 1, wherein the primary air chambers have a communicating passage.

4. A pneumatic suspension comprising: a chassis frame, two primary air chambers positioned in tandem on the chassis frame, each of which has an open bottom closed by a diaphragm, an axle beneath each diaphragm, and an interposed carrier secured to each axle and also secured to the overlying diaphragm, in combination with a snubber cable the opposite ends of which are secured to the opposite sides of the chassis frame with the intermediate portions of the cable looped beneath the axles and passing over anti-friction devices carried by the chassis frame between the axles, said cable being secured substantially midway of its ends to a tensioning device for producing uniform tension throughout the entire length of the cable.

5. Pneumatic suspension comprising: a chassis frame, axles arranged in tandem below said frame, pneumatic cushions interposed between the frame and the axles, and a snubber cable the opposite ends of which are secured to the opposite sides of the chassis frame with the intermediate portions of the cable looped beneath the axles and passing over anti-friction devices carried by the chassis frame between the axles, said cable being secured substantially midway of its ends to a tensioning device for producing uniform tension throughout the entire length of the cable.

6. A pneumatic suspension according to claim 5, wherein a resilient cushion is also interposed between the cable and each axle.

7. An assembly of the character described comprising: a chassis frame, an axle extending transversely beneath said frame, and pneumatic suspension means intermediate the frame and axle for supporting the former above the latter, in combination with a snubber cable the opposite ends of which are secured to the frame with intermediate portions of the cable looped beneath the opposite ends of the axle, and a tensioning device secured to the cable intermediate the ends of the axle for applying uniform tension throughout the entire length of the cable.

8. A pneumatic suspension comprising: a chassis frame, an axle, a primary air chamber secured to the chassis frame and provided with a diaphragm, a lever pivoted to the frame and to the axle, said lever being also secured to and off center of the diaphragm.

9. A pneumatic suspension comprising: a chassis frame, an axle, a primary air chamber secured to the chassis frame and provided with a diaphragm, a lever pivoted to the frame and also secured to the axle, said lever being also secured off center of and to the diaphragm and closer to the edge of the diaphragm contiguous to the pivoted end of the lever than to the opposite edge of the diaphragm.

10. A pneumatic suspension comprising: a chassis frame, an axle below said frame, a primary air chamber on said frame and having an open bottom, a surge chamber carried by the axle below the primary air chamber and having an open top of different size than the bottom opening of the primary air chamber, an elastic diaphragm portion bridging and closing the space between the peripheries of said bottom and top openings, and an elastic diaphragm portion closing the top opening of the surge chamber to isolate it from the primary air chamber and yieldable according to the differential pressures in the primary air and surge chambers.

11. A pneumatic suspension according to claim 10, wherein that portion of the diaphragm which isolates the primary air chamber from the surge chamber has greater elasticity than the section of the diaphragm which isolates the primary air chamber from the atmosphere.

12. A pneumatic suspension according to claim 10, comprising a diaphragm composed of sections, one of which isolates the surge chamber from the primary air chamber and the other of which seals the primary air chamber from the atmosphere, the section which isolates the surge chamber from the primary air chamber being more elastic than the section which isolates the primary air chamber from the atmosphere.

13. A pneumatic suspension according to claim 10, wherein the surge chamber is provided with a normally open valve adapted to be closed when the section of the diaphragm which isolates the surge chamber from the primary air chamber is flexed beyond a predetermined maximum.

14. A pneumatic suspension according to claim 10, wherein the surge chamber is provided with a vent opening forming a valved passage while the portion of the diaphragm which isolates the surge chamber from the primary air chamber is provided with a sealing member adapted to seal said passage when that portion of the diaphragm is flexed sufficiently to engage the sealing member with the inner end of said passage.

15. A pneumatic suspension according to claim 10, wherein the surge chamber is positioned intermediate the ends of the carrier and is provided with fore and aft projections, the former of which is connected to the chassis frame by a universal joint while the latter of which is secured to the axle.

16. A pneumatic suspension comprising: a chassis frame, a primary air chamber carried by the frame and provided with an opening, an axle below said chamber, a carrier secured to the axle and interposed between the axle and the chamber, and a diaphragm secured to the carrier and sealing the opening in said chamber, said carrier being provided with a surge chamber isolated from the interior of the primary air chamber by said diaphragm, in combination with a snubber cable looped beneath the axle and secured to the chassis frame both fore and aft of the axle.

17. A pneumatic suspension according to claim 16, comprising a yieldable cushion interposed between the snubber cable and the axle.

18. A pneumatic suspension according to claim 17, wherein the yieldable cushion is a pneumatic cushion with a duct connecting the interior of said pneumatic cushion with the interior of the primary air chamber.

19. A pneumatic suspension comprising: a chassis frame, two primary air chambers positioned in tandem on the chassis frame, each of which has an open bottom closed by a diaphragm, an axle beneath each diaphragm, and an interposed carrier secured to each axle and also secured to the overlying diaphragm, each carrier being provided with a surge chamber underlying a portion of the corresponding diaphragm and thereby isolated from the overlying primary air chamber, said primary air chambers having a valved communicating passage, and means for operating said valve to open and close communication between said chambers.

20. A pneumatic suspension comprising: a chassis frame, two primary air chambers positioned in tandem on the chassis frame, each of which has an open bottom closed by a diaphragm, an axle beneath each diaphragm, and an interposed carrier secured to each axle and also secured to the overlying diaphragm, each carrier being provided with a surge chamber underlying a portion of the corresponding diaphragm and thereby isolated from the overlying primary air chamber, in combination with a snubber cable looped beneath each axle and secured to the chassis frame fore and aft of each axle with a resilient cushion interposed between each axle and the snubber cable.

21. A pneumatic suspension comprising: a chassis frame, an axle beneath said frame, a pneumatic cushion interposed between the frame and the axle for supporting the frame above the axle, a snubber cable looped beneath the axle and secured to the chassis frame fore and aft of the axle, a pneumatic cushion interposed between the snubber cable and the axle, and a duct interconnecting both pneumatic cushions.

References Cited in the file of this patent

UNITED STATES PATENTS

| | | |
|---|---|---|
| 1,130,656 | Annable | Mar. 2, 1915 |
| 1,202,157 | Burt | Oct. 24, 1916 |
| 1,475,049 | Church | Nov. 20, 1923 |
| 1,654,399 | Battle | Dec. 27, 1927 |
| 2,638,358 | Larison | May 12, 1953 |
| 2,713,498 | Brown | July 19, 1955 |
| 2,742,301 | Pointer | Apr. 17, 1956 |